Oct. 20, 1925.  
F. O. BROOKS  
CARRIAGE RUNNER  
Filed July 13, 1923     2 Sheets-Sheet 1  
1,558,338
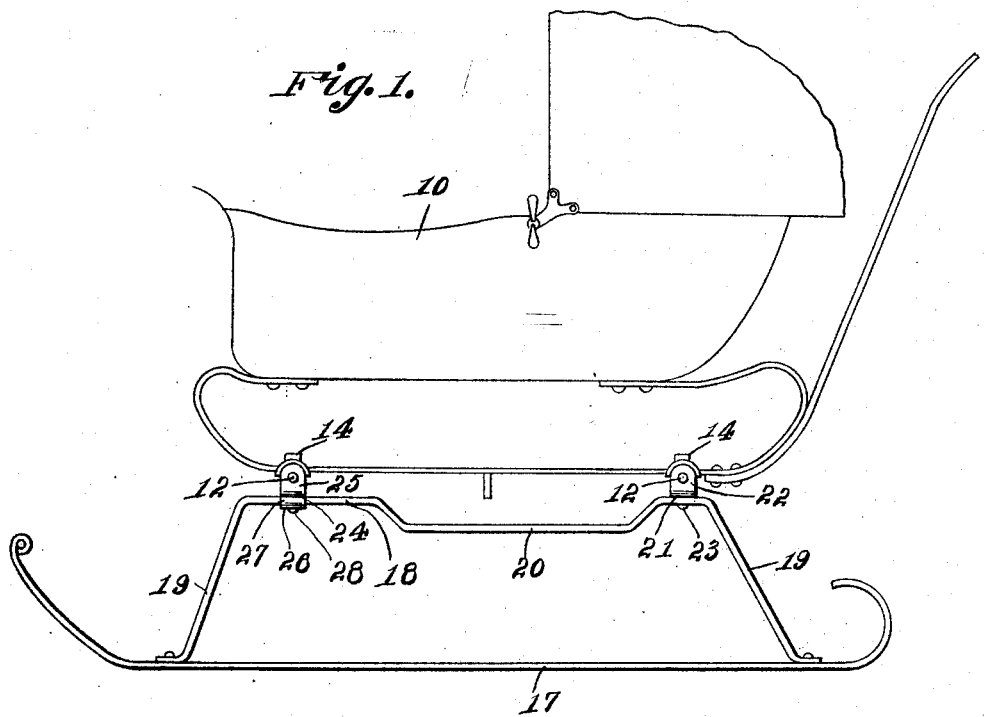
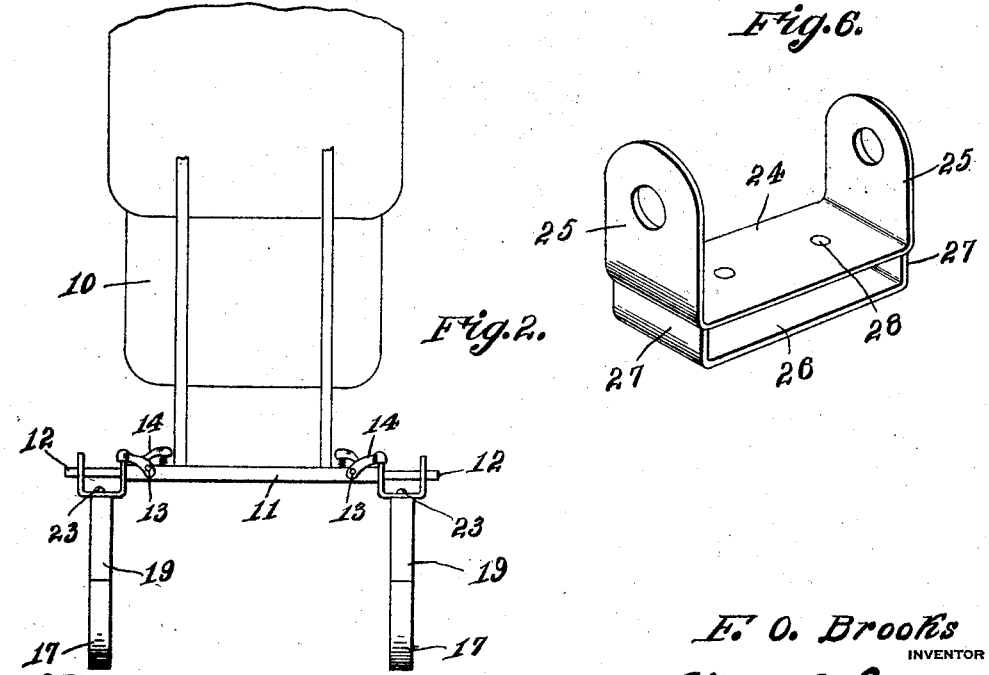
F. O. Brooks
INVENTOR Oct. 20, 1925.
F. O. BROOKS
CARRIAGE RUNNER
Filed July 13, 1923    2 Sheets-Sheet 2
1,558,338
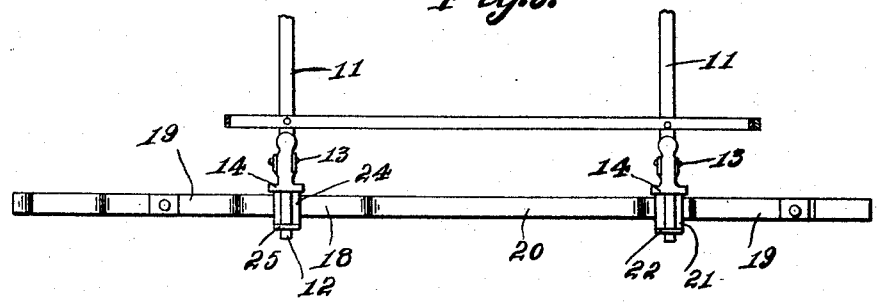
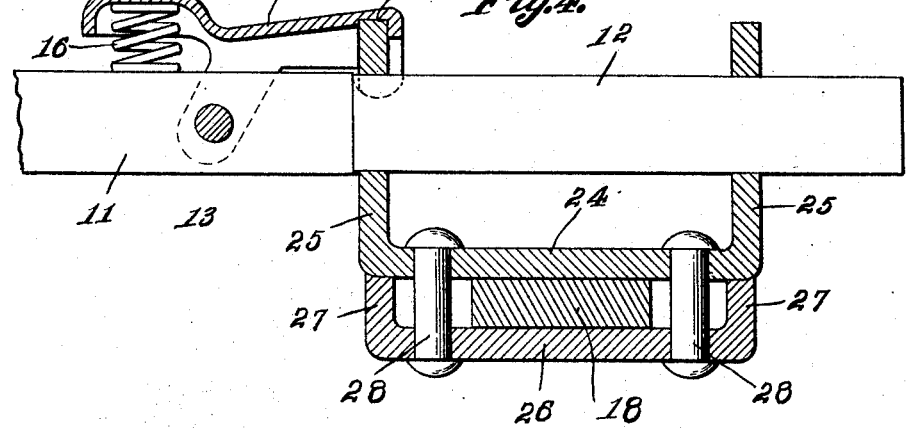
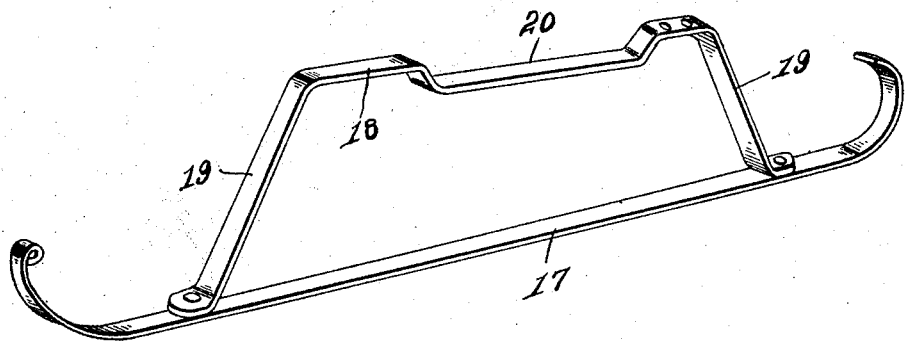
F. O. Brooks
INVENTOR
BY Victor J. Evans
ATTORNEY
WITNESS:

Patented Oct. 20, 1925.

1,558,338

UNITED STATES PATENT OFFICE.

FERN O. BROOKS, OF BOYNE CITY, MICHIGAN.

CARRIAGE RUNNER.

Application filed July 13, 1923. Serial No. 651,365.

*To all whom it may concern:*

Be it known that I, FERN O. BROOKS, a citizen of the United States, residing at Boyne City, in the county of Charlevoix and State of Michigan, have invented new and useful Improvements in Carriage Runners, of which the following is a specification.

This invention relates to improvements in runners and has for an object the provision of a runner which may be removably attached to a perambulator, small wagon or the like, the invention being especially designed to provide means whereby an ordinary baby carriage or perambulator may be converted into a sled.

Another object of the invention is the provision of a runner which may be easily and quickly adjusted to different wheel bases without the use of tools.

Another object of the invention is the provision of means whereby the usual wheel securing means of a carriage may be utilized for securing the runners upon the carriage axles and thus dispense with pins, nuts or similar auxiliary fastening devices.

With the above and other objects in view, the invention further includes the following novel features and details of construction, to be hereinafter more fully described, illustrated in the accompanying drawings and pointed out in the appended claim.

In the drawings:

Figure 1 is a side elevation of a baby carriage with the improved runners applied.

Figure 2 is an end view of the same.

Figure 3 is a horizontal sectional view taken on a plane slightly above the carriage axles and showing one of the runners in top plan view.

Figure 4 is an enlarged fragmentary section taken transversely through the runner and illustrating the securing means.

Figure 5 is a detail perspective view of one of the runners.

Figure 6 is an enlarged perspective view of the adjustable bracket.

Referring in detail to the drawings, wherein like characters of reference denote corresponding parts, the reference character 10 indicates a carriage of the usual construction, 11 the axles and 12 the spindles at each end of the axles. As a means for removably securing the wheels (not shown) upon the spindles, the axles have pivotally mounted thereon as shown at 13 wheel retaining elements which are indicated generally at 14 and whose outer ends are formed to provide arcuate grooves 15 for the reception of annular flanges carried by the hubs of the wheels. The inner ends of the wheel retaining elements 14 are yieldingly forced outward by means of springs 16 so as to hold these elements engaged with the wheels. All of the foregoing is of the usual construction and forms no part of the present invention.

The runner which constitutes the present invention is preferably formed of flat transversely rectangular metal strips and includes a runner proper 17 and a bar 18 spaced above this runner and connected by oppositely inclined braces 19. The bar 18 is preferably offset as shown at 20 so as to provide space for the operation of the ordinary carriage brake.

The bar 18 carries front and rear spindle receiving brackets, the rear bracket comprising a plate 21 from each end of which extends apertured lugs 22 for the reception of the rear axle spindle. The plate 21 is riveted or otherwise secured to the bar 18 as shown at 23.

The front axle bracket also includes a plate 24 from which extend apertured lugs 25 for the reception of the front axle spindle. The upper ends of these lugs are substantially semi-circular and the inner lugs, that is, the lugs at the inner ends of the spindles abut the adjacent ends of the axles and extend within the arcuate grooves 15 of the wheel retaining elements 14. It is thus only necessary to release the wheels and substitute therefor runners.

In order to properly space the brackets to allow for any differences of wheel base, one of the brackets, for example the front axle bracket, has secured thereto a plate 26 which is provided at each end with a right angularly extending lug 27. The plate 26 is spaced below the plate 24 and is secured thereto by means of fastening devices 28, the lugs 27 acting to space the plates apart for the reception of the bar 18. This bracket may thus be conveniently slid longitudinally of the bar until the lugs 25 are in position to receive the spindle.

The invention is susceptible of various changes in its form, proportions and minor details of construction and the right is herein reserved to make such changes as properly fall within the scope of the appended claim.

Having described the invention what is claimed is:—

Carriage runners of the character described embodying flat transversely rectangular metal strips including a runner and an intermediately offset bar spaced above the runner, braces connecting the ends of the bar to the runner, front and rear spindle receiving brackets upon the end portion of the intermediately offset bar, the rear bracket comprising a plate having arcuate shaped apertured registering lugs extending therefrom, the front axle bracket including long and short U-shaped companion members respectively, said short companion member secured to the underside of the long companion member and clamping the front portion of the bar therebetween, the upper ends of the long companion members having registering openings therein to receive the pintles of the axles therein, and spring tensioned holding means receiving the inner arcuate shaped ears of the front and rear axle brackets respectively.

In testimony whereof I affix my signature.

FERN O. BROOKS.